Aug. 7, 1962 R. J. BLAZEK 3,048,733

ELECTROLUMINESCENT DEVICE

Filed Sept. 9, 1960

INVENTOR.
ROBERT J. BLAZEK.

BY

W. D. Palmer

ATTORNEY.

United States Patent Office 3,048,733

Patented Aug. 7, 1962

3,048,733

ELECTROLUMINESCENT DEVICE

Robert J. Blazek, Mendham, N.J., assignor to Westinghouse Electric Corporation, East Pittsburgh, Pa., a corporation of Pennsylvania Filed Sept. 9, 1960, Ser. No. 55,035
13 Claims. (Cl. 313—108)

This invention relates to electroluminescent devices and, more particularly, to an electroluminescent device having improved performance characteristics.

The phenomenon of electroluminescence was first disclosed by G. Destriau, one of his earlier publications appearing in London, Edinburgh and Dublin Philosophical Magazine, Series 7, volume 38, No. 285, pages 700–737 (October 1947). Since this early publication, electroluminescent device have been marketed commercially. The operating characteristics of electroluminescent devices or cells have not been as good as desired. For example, the brightness is relatively low under excitation by normal line voltage and the efficiency at which the cells generate light is relatively poor.

It is the general object of this invention to avoid and overcome the foregoing and other difficulties of and objections to prior-art practices by the provision of an electroluminescent device having improved performance characteristics.

It is another object to provide an electroluminescent device having improved light output.

It is a further object to provide an electroluminescent device having improved efficiency of operation.

The aforesaid objects of the invention, and other objects which will become apparent as the description proceeds, are achieved by providing an improved dielectric medium or material for an electroluminescent device. This improved dielectric material comprises a conventional plastic dielectric medium, such as a polyvinyl chloride type plastic, having dissolved therein from 5% to 35% by weight of selected organic compound. This selected organic compound has a boiling point of at least 200° C. at atmospheric pressure and is either a light-transmitting aromatic nitro-substituted benzene compound, or a light-transmitting aromatic nitrile-substituted benzene compound, or a mixture thereof.

For a better understanding of the invention, reference should be had to the accompanying drawings wherein.

Although the principles of this invention are broadly applicable to any electroluminescent cell or device, such as an imaging device, the invention is conveniently employed in conjunction with an electroluminescent cell designated to serve as a source of illumination and hence it has been so illustrated and will be so described.

Figure 1:
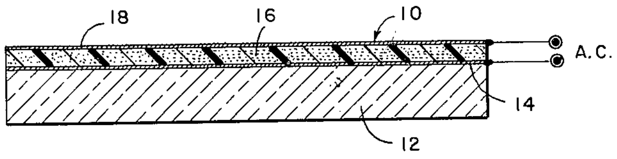
FIG. 1 is a sectional elevational view of an electroluminescent cell which incorporates the improved dielectric material of this invention.

With specific reference to the form of the invention illustrated in the drawings, in FIG. 1 is shown an electroluminescent cell 10 which generally comprises a glass foundation 12 having carried thereon a first electrode 14 which is formed of tin oxide. Coated over the electrode 14 is a layer 16 comprising electroluminescent phosphor embedded in the improved dielectric material of this invention. Coated over the layer 16 is a second electrode 18 which is formed of vacuum metallized aluminum or light-transmitting copper iodide, for example. An alternating electric potential is adapted to be applied across the electrodes 14 and 18 in order to energize the electroluminescent cell.

The tin oxide electrode 14 can be formed of other suitable light-transmitting, electrically conducting material such as indium oxide or copper iodide. The phosphor can comprise any electroluminescent phosphor and a specific example is zinc sulfide activated by copper and coactivated with chlorine, preferably additionally processed by baking in air in accordance with the teachings contained in copending application S.N. 29,431, filed May 16, 1960, and owned by the present assignee. The phosphor is finely divided with an average particle diameter of about 12 microns and two parts by weight are mixed with one part by weight of the present improved dielectric material, as will be described hereinafter. The respective parts by weight of phosphor and dielectric are in no way critical and can be varied over a wide range. As an example, if the phosphor-to-plastic dielectric weight ratio is as small as 1:20, the light emission normally will be somewhat reduced because of the decreased phosphor. When the phosphor-to-plastic weight ratio is as great as 20:1, both the efficiency and the operational maintenance of initial light output normally will be somewhat decreased. Even this foregoing broad range for the phosphor-plactic dielectric proportions can be extended, however, for special applications. The thickness of the phosphor-dielectric layer 16 is not critical and can be varied considerably. A representative usable thickness for the phosphor-dielectric layer 16 is two mils. The average particle diameter of the finely divided electroluminescent phosphor can also be varied considerably.

Figure 2:
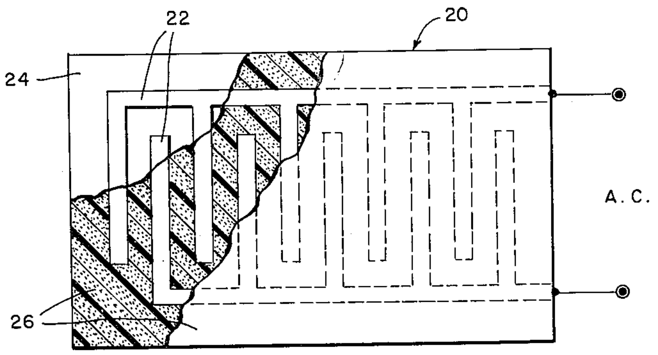
FIG. 2 is a plan view, partly broken away, of an electroluminescent cell incorporating the improved plastic dielectric material of the present invention and wherein the electrodes are formed as an interlacing, raster-type grid.
Figure 3:
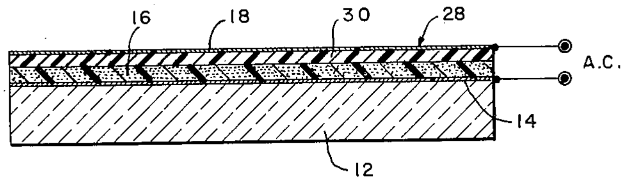
FIG. 3 is a sectional elevational view of an alternative construction generally corresponding to the cell as shown in FIG. 1, but wherein an additional layer of dielectric material is also included between the cell electrodes.

The cell embodiment 20, as shown in FIG. 2, is essentially fabricated as disclosed in FIG. 3 of U.S. Patent No. 2,684,450, dated July 20, 1954. Briefly, this cell embodiment comprises interlacing, raster-type electrodes 22 which are formed on an insulating foundation 24 and the present improved dielectric material and mixed finely divided phosphor 26 are carried between the interlacing electrodes 22. An A.C. potential is adapted to be applied across the interlacing electrodes 22.

The cell embodiment 28, as shown in FIG. 3, corresponds to the embodiment 10 as shown in FIG. 1, except that an additional two-mil-thick separate layer 30 of the present improved plastic dielectric material, as described hereinatfer, is also included between the lamp electrodes 14 and 18. The thickness of the layer 30 can be varied considerably. Such a construction enables the energizing potential applied across the lamp electrodes to be increased. Other known dielectric materials such as mica can be used to form the layer 30.

Figure 4:
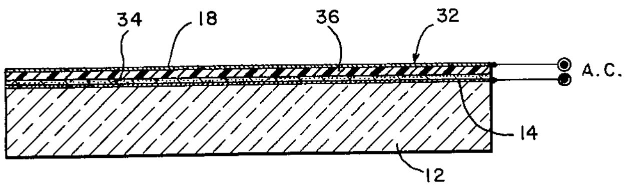
FIG. 4 is a sectional elevational view of an alternative embodiment generally corresponding to that shown in FIG. 3, but wherein the phosphor is in the form of a thin, continuous film.

The cell embodiment 32, as shown in FIG. 4, generally corresponds to the embodiment 28 as shown in FIG. 3 except that the phosphor is formed as a continuous thin film 34. As an example, the phosphor film 34 has a thickness of four microns and such tin films preferably are formed as described in copending application S.N. 837,988, filed September 3, 1959, and owned by the present assignee. A separate layer 36 of the present improved dielectric material is also included between the electrodes 14 and 18 and serves to increase the breakdown potential across the cell electrodes. It can be seen that all of the cell embodiments as illustrated and described hereinbefore essentially comprise spaced electrodes with electrically insulated and non-electroluminescent dielectric material and electroluminescent phosphor included between the spaced electrodes.

The improved plastic dielectric material of this invention incorporates as a base material any conventional plastic dielectric as used in so-called plastic electroluminescent cells. As an example, the plastic dielectric preferably comprises a polyvinyl chloride type such as polyvinyl chloride, polyvinyl chloride acetate or any copolymers thereof. Polyurethane resins have also been found to be quite satisfactory, as has an impregnating varnish comprising silicone alkyd resin sold under the trademark "Sylkyd" by Dow Corning Corporation. The base dielectric material can also comprise castor oil. All of the foregoing dielectric materials have a boiling point of at least 200° C. at atmospheric pressure and it is necessary that the base dielectric have at least such a boiling point in order to provide the electroluminescent cell with adequate stability. In accordance with the present invention, there is dissolved in the base dielectric material from 5% to 35% by weight of a light-transmitting, aromatic, nitro-substituted benzene compound, or a light-transmitting, aromatic, nitrile-substituted benzene compound, or any mixtures thereof. As a specific example, the following nitro-substituted benzene compounds have been found to be very satisfactory; p-nitrophenol (the meta isomer is also suitable); 2,4-dinitrophenetole; 2,4-dinitroanisole; 4,6-dinitro-o-cresol; 2,6-dinitrothymol; and p-nitroanisole. The following nitrile-substituted benzene compounds have been found to be very satisfactory: p-aminobenzonitrile and anisonitrile. Any mixtures of these additive materials can also be used. Any organic dielectric base material can be utilized provided it is a solvent for the nitro-substituted or nitrile-substituted benzene compound. Similarly, any nitro-substituted benzene compound or any nitrile-substituted benzene compound can be used with beneficial effects, provided it is compatible with the base dielectric material and also has a boiling point of at least 200° C. The preferred base dielectric material is a polyvinyl chloride type, as is conventionally used in electroluminescent cells. A very satisfactory additive benzene compound material is 2,4-dinitrophenetole, hereinafter referred to as DNP, and dielectric mixtures of the polyvinyl chloride and DNP were used in fabricating the test cells to obtain the following performance data.

In fabricating electroluminescent cells to obtain performance data, the construction utilized was that shown in FIG. 1 and described hereinbefore. The ratio by weight of phosphor to plastic was approximately 2:1. A series of identical electroluminescent cells were fabricated, varying only the percent by weight of DNP. The control cell, which incorporated only the polyvinyl chloride dielectric material, displayed an initial brightness, of 4.1 arbitrary units and test results are indicated in the following Table I.

*Table I*

| Percent by weight DNP in base dielectric | Initial Brightness (Arbitrary Units) |
|---|---|
| 0 (control) | 4.1 |
| 5 | 5.5 |
| 10 | 5.8 |
| 15 | 6.4 |
| 20 | 6.9 |
| 25 | 7.9 |
| 30 | 8.6 |
| 35 | 11.3 |

The measured capacitance of the test electroluminescent cells also increased with increasing amounts of the indicated additive substituted benzene compound. The control cell, which incorporated no additive, displayed a capacitance of 3,400 $\mu\mu$f. With encreasing amounts of the indicated additive DNP, the capacitance increased accordingly and at 35% by weight of additive, the electroluminescent cell displayed a capacitance of 6,850 $\mu\mu$f. It should be noted that the maximum brightness increase of almost three-fold is greater than would be expected from the corresponding two-fold capacitance increase.

The efficiency of electroluminescent cells incorporating the present improved dielectric material is also increased, although to a lesser degree than the brightness increase which is realized, the maximum efficiency increase being 43%. The maintenance of initial light output for the control cell and the improved cells was approximately the same. When the concentration of the additive substituted benzene was excessive, the maintenance of light output became relatively poor. For this reason, the maximum amount of the indicated additive to the base dielectric material should be 35% by weight or less.

Considering all factors which affect overall cell performance, namely, brightness, efficiency and maintenance of light output, it is preferred to add the indicated substituted benzene compounds in amount of about 25% by weight of the base dielectric material.

It will be recognized that the objects of the invention have been achieved by providing an electroluminescent device having improved overall performance characteristics, including improved light output as well as somewhat improved efficiency of operation.

While best examples of the invention have been illustrated and described in detail, it is to be particularly understood that the invention is not limited thereto or thereby.

I claim:

1. An electroluminescent device comprising: spaced electrodes; electrically insulating and non-electroluminescent dielectric material and electroluminescent phosphor included between said spaced electrodes; and said non-electroluminescent dielectric material comprising, a light-transmitting organic dielectric medium having a boiling point of at least 200° C. at atmospheric pressure and which dielectric medium is a solvent for at least one material of the group consisting of aromatic nitro-substituted benzene compound and aromatic nitrile-substituted benzene compound, additive dielectric compound having a different composition from said organic dielectric medium and dissolved in said organic dielectric medium in amount of from 5% to 35% by weight of said organic dielectric medium, said additive compound having a boiling point of at least 200° C. at atmospheric pressure and selected from at least one material of the group consisting of light-transmitting aromatic nitro-substituted benzene compound and light-transmitting aromatic nitrile-substituted benzene compound.

2. An electroluminescent device comprising: spaced electrodes; electrically insulating and non-electroluminescent dielectric material having embedded therein finely divided electroluminescent phosphor and included between said spaced electrodes; and said non-electroluminescent dielectric material comprising, a light-transmitting organic dielectric medium having a boiling point of at least 200 C. at atmospheric pressure and which dielectric medium is a solvent for at least one material of the group consisting of aromatic nitro-substituted benzene compound and aromatic nitrile-substituted benzene compound, additive dielectric compound having a different composition from said organic dielectric medium and dissolved in said organic dielectric medium in amount of from 5% to 35% by weight of said organic dielectric medium, said additive compound having a boiling point of at least 200° C. at atmospheric pressure and selected from at least one material of the group consisting of light-transmitting aromatic nitro-substituted benzene compound and light-transmitting aromatic nitrile-substituted benzene compound.

3. An electroluminescent device comprising: spaced electrodes at least one of which is light transmitting; electrically insulating and non-electroluminescentt dielectric material having embedded therein finely divided electroluminescent phosphor and included as a layer between said spaced electrodes; and said non-electroluminescent dielectric material comprising, a light-transmitting organic dielectric medium having a boiling point of at least 200° C. at atmospheric pressure and which dielectric medium is a solvent for at least one material of the group consisting of aromatic nitro-substituted benzene compound and aromatic nitrile-substituted benzene compound, additive dielectric compound having a different composition from said organic dielectric medium and dissolved in said organic dielectric medium in amount of from 5% to 35% by weight of said organic dielectric medium, said additive compound having a boiling point of at least 200° C. at atmospheric pressure and selected from at least one material of the group consisting of light-transmitting aromatic nitro-substituted benzene compound and light-transmitting aromatic nitrole substituted benzene compound.

4. An electroluminescent device as specified in claim 3, wherein said additive dielectric compound is dissolved in said dielectric medium in amount of about 25% by weight.

5. An electroluminescent device as specified in claim 3, wherein said dielectric medium is polyvinyl-chloride acetate.

6. An electroluminescent device comprising; spaced electrodes at least one of which is light transmitting; electrically insulating and non-electroluminescent dielectric material having embedded therein finely divided electroluminescent phosphor and included as a layer between said spaced electrodes; and said non-electroluminescent dielectric material comprising, a light-transmitting solid thermoplastic dielectric medium having a boiling point of at least 200° C. at atmospheric pressure, and p-nitrophenol dissolved in said dielectric medium in amount of from 5% to 35% by weight.

7. An electroluminescent device comprising; spaced electrodes at least one of which is light transmitting; electrically insulating and non-electroluminescent dielectric material having embedded therein finely divided electroluminescent phosphor and included as a layer between said spaced electrodes; and said non-electroluminescent dielectric material comprising, a light-transmitting solid thermoplastic dielectric medium having a boiling point of at least 200° C. at atmospheric pressure, and 2,4-dinitrophenetole dissolved in said dielectric medium in amount of from 5% to 35% by weight.

8. An electroluminescent device comprising; spaced electrodes at least one of which is light transmitting; electrically insulating and non-electroluminescent dielectric material having embedded therein finely divided electroluminescent phosphor and included as a layer between said spaced electrodes; and said non-electroluminescent dielectric material comprising, a light-transmitting solid thermoplastic dielectric medium having a boiling point of at least 200° C. at atmospheric pressure, and 2,4-dinitroanisole dissolved in said dielectric medium in amount of from 5% to 35% by weight.

9. An electroluminescent device comprising; spaced electrodes at least one of which is light transmitting; electrically insulating and non-electroluminescent dielectric material having embedded therein finely divided electroluminescent phosphor and included as a layer between said spaced electrodes; and said non-electroluminescent dielectric material comprising, a light-transmitting solid thermoplastic dielectric medium having a boiling point of at least 200° C. at atmospheric pressure, and 4,6-dinitro-o-cresol dissolved in said dielectric medium in amount of from 5% to 35% by weight.

10. An electroluminescent device comprising; spaced electrodes at least one of which is light transmitting; electrically insulating and non-electroluminescent dielectric material having embedded therein finely divided electroluminescent phosphor and included as a layer between said spaced electrodes; and said non-electroluminescent dielectric material comprising, a light-transmitting solid thermoplastic dielectric medium having a boiling point of at least 200° C. at atmosphere pressure, and 2,6-dinitrothymol dissolved in said dielectric medium in amount of from 5% to 35% by weight.

11. An electroluminescent device comprising; spaced electrodes at least one of which is light transmitting; electrically insulating and non-electroluminescent dielectric material having embedded therein finely divided electroluminescent phosphor and included as a layer between said spaced electrodes; and said non-electroluminescent dielectric material comprising, a light-transmitting solid thermoplastic dielectric medium having a boiling point of at least 200° C. at atmospheric pressure, and p-nitroanisole dissolved in said dielectric medium in amount of from 5% to 35% by weight.

12. An electroluminescent device comprising; spaced electrodes at least one of which is light transmitting; electrically insulating and non-electroluminescent dielectric material having embedded therein finely divided electroluminescent phosphor and included as a layer between said spaced electrodes; and said non-electroluminescent dielectric material comprising, a light-transmitting solid thermoplastic dielectric medium having a boiling point of at least 200° C. at atmospheric presure, and p-aminobenzonitrile dissolved in said electric medium in amount of 5% to 135% by weight.

13. An electroluminescent device comprising; spaced electrodes at least one of which is light transmitting; electrically insulating and non-electroluminescent dielectric material having embedded therein finely divided electroluminescent phosphor and included as a layer between said spaced electrodes; and said non-electroluminescent dielectric material comprising, a light-transmitting solid thermoplastic dielectric medium having a boiling point of at least 200° C. at atmospheric pressure, and anisonitrile dissolved in said dielectric medium in amount of from 5% to 35% by weight.

References Cited in the file of this patent

UNITED STATES PATENTS

| | | |
|---|---|---|
| 2,765,419 | Roberts | Oct. 2, 1956 |
| 2,774,004 | Jaffe | Dec. 11, 1956 |
| 2,838,715 | Payne | June 10, 1958 |